United States Patent [19]

Wigley et al.

[11] Patent Number: 4,699,308
[45] Date of Patent: Oct. 13, 1987

[54] METHOD AND APPARATUS FOR WORKING SOLDER

[76] Inventors: Kenneth C. Wigley, Hole Farm Cottage, Calladine Lane, Shottle, Derbyshire; John D. Jeffrey, 16 Hill Close, Turnditch, Derbyshire, both of England

[21] Appl. No.: 836,803

[22] Filed: Mar. 6, 1986

[51] Int. Cl.⁴ ............................................. B23K 1/00
[52] U.S. Cl. ....................................... 228/19; 228/53
[58] Field of Search .................................. 228/53, 19

[56] References Cited

U.S. PATENT DOCUMENTS

| | | | |
|---|---|---|---|
| 1,127,970 | 2/1915 | Dryfoos | 228/53 |
| 1,646,238 | 10/1927 | Ensdorf et al. | 228/53 |
| 2,462,131 | 2/1949 | Rustin | 228/53 |
| 2,689,901 | 9/1954 | Obolensky | 228/53 |
| 3,114,026 | 12/1963 | Fortune | 228/19 |
| 3,580,462 | 5/1971 | Vanyi | 228/53 |

Primary Examiner—Nicholas P. Godici
Assistant Examiner—Karen Skillman
Attorney, Agent, or Firm—W. Thad Adams, III

[57] ABSTRACT

A soldering tip has a sleeve (10) with an insert (14) therein, both formed of good heat conducting material. An annular passage between the sleeve (10) and the insert (14) enables travel of solder therein by capilliary action when heat is applied to the tip and the latter contacts solder. The insert (14) is movable outwardly of the sleeve (10) to discharge solder in the annular passage from the tip.

11 Claims, 1 Drawing Figure

U.S. Patent
Oct. 13, 1987
4,699,308
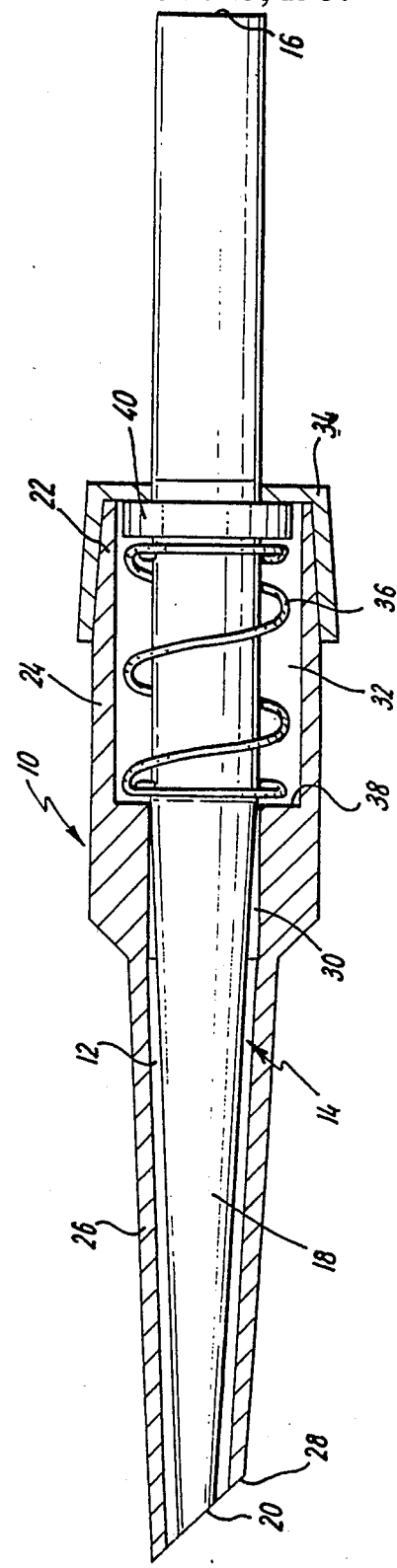

METHOD AND APPARATUS FOR WORKING SOLDER

This invention relates to a method and apparatus for working solder, particularly for selectively soldering and desoldering. The term "solder" as used hereinafter is intended to embrace any metal or alloy.

Solder is presently extensively used in the manufacture of, for example, printed circuit boards, and it is necessary not only to be able to apply solder to circuit boards of different dimensions but also to remove solder from circuit boards. None of the known methods of desoldering have been found to be as efficient as it is desired in removing all unwanted solder or discharging the solder after removal, and, in addition, most of the methods presently in use require an instrument in each hand of the person working on the circuit board.

It is an object of the present invention to provide an apparatus and method which obviates or mitigates the disadvantages of the existing apparatus and methods.

According to the present invention there is provided apparatus for working solder, said apparatus comprising a first member having a bore extending therethrough, a second member formed of a heat conducting material adapted to be connected to a heat source and being so located in the bore of the first member as to define a path between the first and second members for travel therealong by capilliary action of solder when heat is applied to the apparatus and the latter is in contact with solder, the first and second members being movable relative to one another between a first or working position and a second position wherein the second member projects outwardly of the first member to discharge solder from the capilliary path, means being provided for preventing release of the first and second members from one another in each of said first and second positions.

Preferably the first member is in the form of a sleeve within which is located the second member in the form of an insert.

Preferably also the insert has a working part of cross-section tapering towards the working end thereof with the sleeve having a corresponding working part wherein the cross-section of the bore tapers towards the working end.

Further, the bore of the sleeve may have an enlarged section at the non-working end of the sleeve, and a spring may extend between a shoulder defined by the enlarged section and a collar on the insert, whereby to bias the latter to the first or working position.

Advantageously a locking ring surrounds the insert which is movable therethrough, the locking ring engaging with the non-working end of the sleeve and the collar on the insert being arranged to abut against the locking ring in the first or working position of the insert.

The invention also provides a kit of parts comprising an apparatus according to any of the five preceding paragraphs and a heat sink assembly having a heat sink and means for supporting the apparatus in a heat conducting relation to the heat sink.

An embodiment of the present invention will now be described by way of example only with reference to the single figure of the accompanying drawing, which is an axial cross-section through an apparatus according to the invention.

Referring to the drawing, there is shown an apparatus in the form of a tip for mounting on a soldering iron support (not shown). The tip comprises a sleeve 10 having a central through bore 12 in which is located an insert 14, the latter, at a non-working end 16, being connected by any suitable coupling arrangement to a heat source.

The insert 14 is formed of a good heat conducting material, for example brass or copper, and is of substantially circular shape in cross-section along part of its length extending from the non-working end 16. A working part 18 of the insert 14 has a cross-section tapering towards a working end 20 thereof and the latter is cut at an angle relative to the central axis of the insert 14.

The sleeve 10 is preferably formed of the same material as the insert 14 and comprises three parts of differing cross-section. At its non-working end the sleeve 10 has a part 22 tapering in cross-section towards the free end of the sleeve, the part 22 connecting with an intermediate part 24 of circular cross-section. The latter then leads on to a third part 26 which has a cross-section tapering towards a working end 28 of the sleeve. The end 28 is cut at an angle relative to a central axis of the sleeve. The bore 12 is thus of tapering cross-section in the working part 26 of the sleeve 10, leading into a length 30 of constant cross-section within the intermediate part 24 of the sleeve. Also within the intermediate part 24 the length 30 of the bore 12 leads into an enlarged diameter section 32 of constant cross-section which extends to the free end of the non-working part 22 of the sleeve 10.

The angle of taper of the working part 18 of the insert 14 equals the angle of taper of the working part 26 of the sleeve 10 and the diameter of the working section 18 of the insert 14 is such as to define an annular passage between the sleeve 10 and the insert 14. Further, the angles of cut at the working ends of the insert 14 and the sleeve 10 are the same so that in a working position as shown in the drawing, the working end 20 of the insert 14 is aligned with the working end 28 of the sleeve 10. The tapered working part 18 of the insert 14 is of such a length as to extend from the working end 28 to the beginning of the enlarged diameter section 32 of the bore 12, in the working position.

A locking ring 34 of generally cup-shape having outwardly tapering walls is fitted over the non-working end of the sleeve 10 to close the enlarged section 32 of the bore 12. The ring 34 has a central aperture through which extends the insert 14. Within the enlarged section 32 a compression spring 36 extends between a shoulder 38, defined by the stepped bore 12, and an annular collar 40 on the insert 14, whereby to bias the latter to the working position where the collar 40 abuts the locking ring 34 and the working end 20 of the insert is aligned with the working end 28 of the sleeve.

The sleeve 10 is preferably formed of the same material as the insert 14 such that when heat is emitted from the heat source, the air gap between the insert 14 and the sleeve 10 is heated.

When it is desired to remove solder, for example from a printed circuit board, the soldering iron tip, comprising the insert 14 with the sleeve 10, is heated and the free end of the tip is applied to the solder which is to be removed. This solder is then melted and flows into the tip along the capilliary passage between the insert 14 and the sleeve 10 until the solder is cleanly and effectively removed from the circuit board. It will be appreciated that the area of the annular passage increased in a direction away from the working end of the tip as far as the end of the working part 26 in view of the increase in diameter, so as to enable an increase in the flow of the molten solder away from the working end and avoid any blocking of the working end. When the solder is removed from the circuit board and is to be discharged from the tip, the sleeve 10 is moved by any suitable means relative to the insert 14 in a direction towards the heat source against the bias of the spring 36, and this relative movement causes the solder in the capilliary passage to be discharged as the insert 14 is projected outwardly of the sleeve 10. It will be appreciated that such a method of desoldering is extremely simple and effective and the person carrying out the operation is required to use only one instrument and therefore only one hand need be occupied.

For the assistance of the user, the tip can be supplied in a kit of parts including a heat sink assembly which can be connected to an electrical supply. The heat sink assembly may be designed so that the soldering iron can be supported thereon with the tip in a heat conducting relationship with the heat sink, and the apparatus may also be provided with a seat defining at least one aperture which is dimensioned to receive the tapered working part of the tip, so that when the sleeve 10 is located in the aperture, the soldering iron with the insert can be moved relative thereto so as to eject unwanted solder.

The soldering iron with the tip can also be used for applying solder to such as a printed circuit board. The capilliary annular passage is first blocked by applying melted solder thereto. When heat is applied to the tip for melting a solder rod in a conventional way, the solder in the annular passage melts, but capilliary action prevents the solder passing out of the passage and therefore allows for soldering of a circuit board in the normal way.

It will be appreciated that the tip assembly is such that it is possible to remove the insert fom the sleeve for cleaning by removing the locking ring. The possiblity of moving the insert relative to the sleeve also prevents the insert and sleeve from being inadvertently locked together.

The capilliary action is also assisted by the temperature differential along the length of the tip dependent on the distance from the heat source.

It is preferred that a vent hole (not shown) is provided in the sleeve to communicate between the capilliary passage and externally.

Various modifications may be made without departing from the invention. For example the arrangement of a locking part on the non-working end of the sleeve may be other than that described and shown provided the locking part can carry out a releasable locking function.

We claim:

1. An apparatus for working solder, said apparatus comprising a first member having a bore extending therethrough, a second member formed of a heat conducting material adapted to be connected to a heat source and being so located in the bore of the first member as to define a path between the first and second members for travel therealong by capillary action of solder when heat is applied to the apparatus and the latter is in contact with solder, said first member comprising a sleeve within which is located the second member, which comprises an insert, the bore of said sleeve including an enlarged section at the non-working end of the sleeve with a spring extending between a shoulder defined by the enlarged section and a collar on the insert to bias the latter to the first or working position, a locking ring surrounding the insert which is movable therethrough, said locking ring engaging with the non-working end of the sleeve and the collar on the insert arranged to abut the locking ring in the first or working position of the insert; the first and second members being movable relative to one another between a first or working position and a second position wherein the second member projects outwardly of the first member to discharge solder from the capillary path and means for preventing release of the first and second members from one another in each of said first and second positions.

2. An apparatus according to claim 1, wherein the insert has a working part of cross-section tapering towards the working end thereof with the sleeve having a corresponding working part wherein the cross-section of the bore tapers towards the working end.

3. A kit of parts comprising apparatus for working solder, said apparatus comprising a first member having a bore extending therethrough, a second member formed of a heat conducting material adapted to be connected to a heat source and being so located in the bore of the first member as to define a path between the first and second members for travel therealong by capillary action of solder when heat is applied to the apparatus and the latter is in contact with solder, the first and second members being movable relative to one another between a first or working position and a second position wherein the second member projects outwardly of the first member to discharge solder from the capillary path, means being provided by preventing release of the first and second members from one another in each of said first and second positions and a heat sink assembly having a heat sink and means for supporting the apparatus in a heat conducting relation to the heat sink, wherein the first member comprises a sleeve within which is located the second member, which comprises an insert, the bore of said sleeve having an enlarged section at the non-working end thereof with a spring extending between a shoulder defined by the enlarged section and a collar on the insert to bias the latter to the first or working position and including a locking ring surrounding the insert and being movable therethrough, said locking ring engaging the non-working end of the sleeve and the collar on the insert being arranged to abut the locking ring in the first or working position of the insert.

4. Apparatus for working solder, said apparatus comprising a first member having a bore extending therethrough, a second member formed of a heat conducting material located in the bore of the first member and adapted to be connected to a heat source and a single path for travel therealong of solder when heat is applied to the second member and the latter is in contact with the solder, the path being defined between the first and second members which are adapted to enable travel of the solder by capillary action in the path, and the first and second members being movable relative to one another between a first or working position and a second position wherein the second member projects outwardly of the first member to discharge solder from the capillary path, means being provided for preventing release of the first and second members from one another in each of said first and second positions.

5. Apparatus according to claim 4, wherein the first member is in the form of a sleeve within which is located the second member in the form of an insert, the bore of the sleeve having an enlarged section at the non-working end of the sleeve, and a spring extending between a shoulder defined by the enlarged section and a collar on the insert, whereby to bias the latter to the first or working position.

6. Apparatus according to claim 5, wherein a locking ring surrounds the insert which is movable therethrough, the locking ring engaging with the non-working end of the sleeve and the collar on the insert being arranged to abut the locking ring in the first or working position of the insert.

7. Apparatus according to claim 5 or 6, wherein the insert has a working part of cross-section tapering towards the working end thereof with the sleeve having a corresponding working part wherein the cross-section of the bore tapers towards the working end.

8. A kit of parts comprising apparatus for working solder, said apparatus comprising a first member having a bore extending therethrough, a second member formed of a heat conducting material located in the bore of the first member and adapted to be connected to a heat source and a single path for travel therealong of solder when heat is applied to the second member and the latter is in contact with the solder, the path being defined between the first and second members which are adapted to enable travel of the solder by capillary action in the path, and the first and second members being movable relative to one another between a first or working position and a second position wherein the second member projects outwardly of the first member to discharge solder from the capillary path, means being provided for preventing release of the first and second members from one another in each of said first and second positions, and a heat sink assembly having a heat sink and means for supporting the apparatus in a heat conducting relation to the heat sink.

9. A kit of parts according to claim 8, wherein the first member is in the form of a sleeve within which is located the second member in the form of an insert, the bore of the sleeve having an enlarged section at the non-working end of the sleeve, and a spring extending between a shoulder defined by the enlarged section and a collar on the insert, whereby to bias the latter to the first or working position.

10. A kit of parts according to claim 9, wherein a locking ring surrounds the insert which is movable therethrough, the locking ring engaging with the non-working end of the sleeve and the collar on the insert being arranged to abut the locking ring in the first or working position of the insert.

11. A kit of parts according to claim 9 or 10, wherein the insert has a working part of cross-section tapering towards the working end thereof with the sleeve having a corresponding working part wherein the cross-section of the bore tapers towards the working end.

* * * * *